A. LEIBNER.
SAFETY FENDER.
APPLICATION FILED JAN. 6, 1917.

1,237,917.

Patented Aug. 21, 1917.
2 SHEETS—SHEET 1.

WITNESSES
Geo. W. Naylor
A. L. Kitchin.

INVENTOR
Albert Leibner
BY Wm. Leo
ATTORNEYS

A. LEIBNER.
SAFETY FENDER.
APPLICATION FILED JAN. 6, 1917.
1,237,917.
Patented Aug. 21, 1917.
2 SHEETS—SHEET 2.
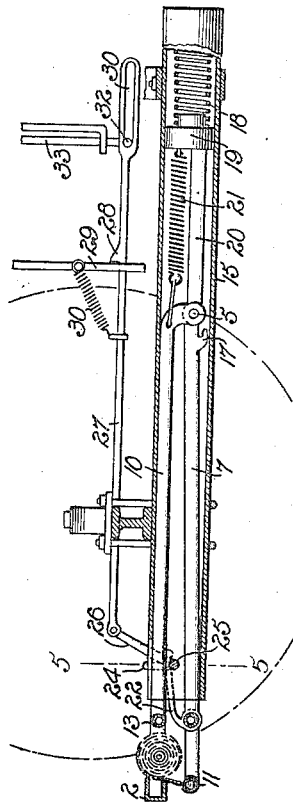
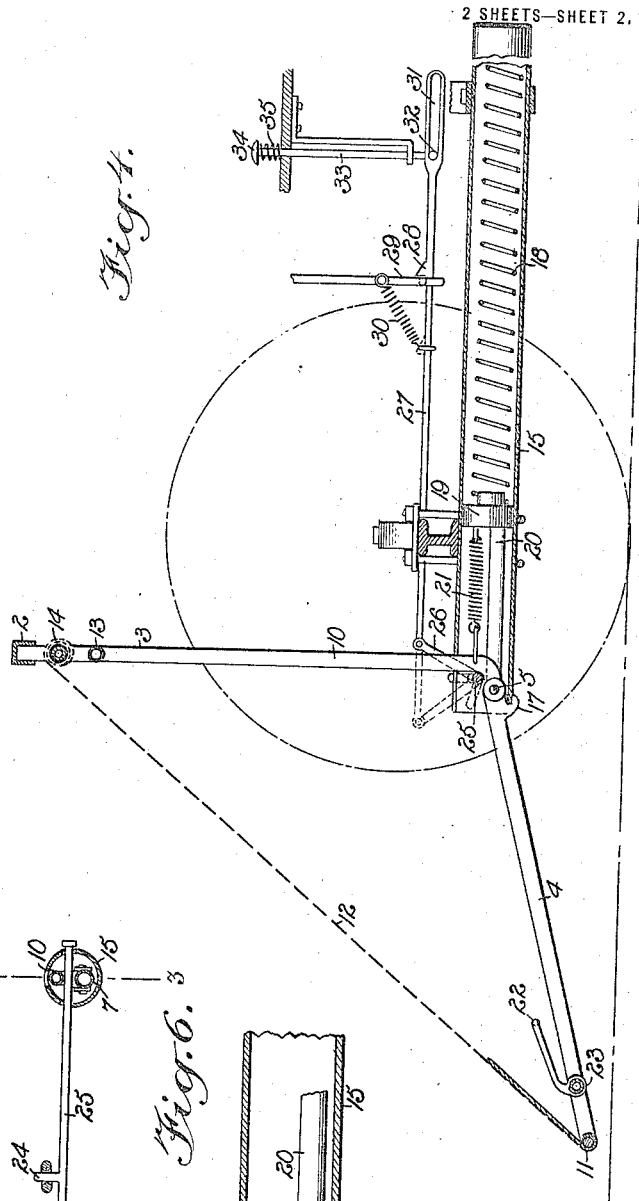
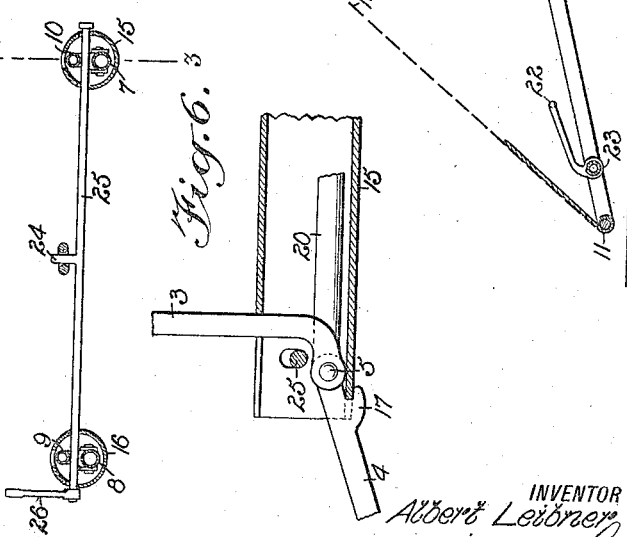
WITNESSES
INVENTOR
Albert Leibner
BY
ATTORNEYS

UNITED STATES PATENT OFFICE.

ALBERT LEIBNER, OF NEW YORK, N. Y.

SAFETY-FENDER.

1,237,917.

Specification of Letters Patent.

Patented Aug. 21, 1917.

Application filed January 6, 1917. Serial No. 140,913.

*To all whom it may concern:*

Be it known that I, ALBERT LEIBNER, a citizen of the United States, and a resident of the city of New York, borough of Manhattan, in the county and State of New York, have invented a new and Improved Safety-Fender, of which the following is a full, clear, and exact description.

This invention relates to fenders for vehicles and particularly to an improved fender for automobiles, and has for an object the provision of a construction which will normally act as a bumper but which may be caused to unfold and act as a catching or fending device.

Another object in view is to provide a fender for vehicles which is foldable and which may be telescopically fitted into a holder beneath the front part of the vehicle in such a way as to be readily released for spreading a net or receiving sheet in front of the vehicle.

In the accompanying drawings:—

Fig. 3 is a longitudinal vertical section through the fender, the same being taken on line 3—3 of Fig. 5.

Fig. 4 is a sectional view similar to Fig. 3 but showing the parts in their unfolded or operative position.

Fig. 5 is a transverse sectional view through Fig. 3 on line 5—5.

Fig. 6 is an enlarged detail fragmentary sectional view showing the pivotal connection between the frames of the fender and also showing a locking hook.

Figure 1:
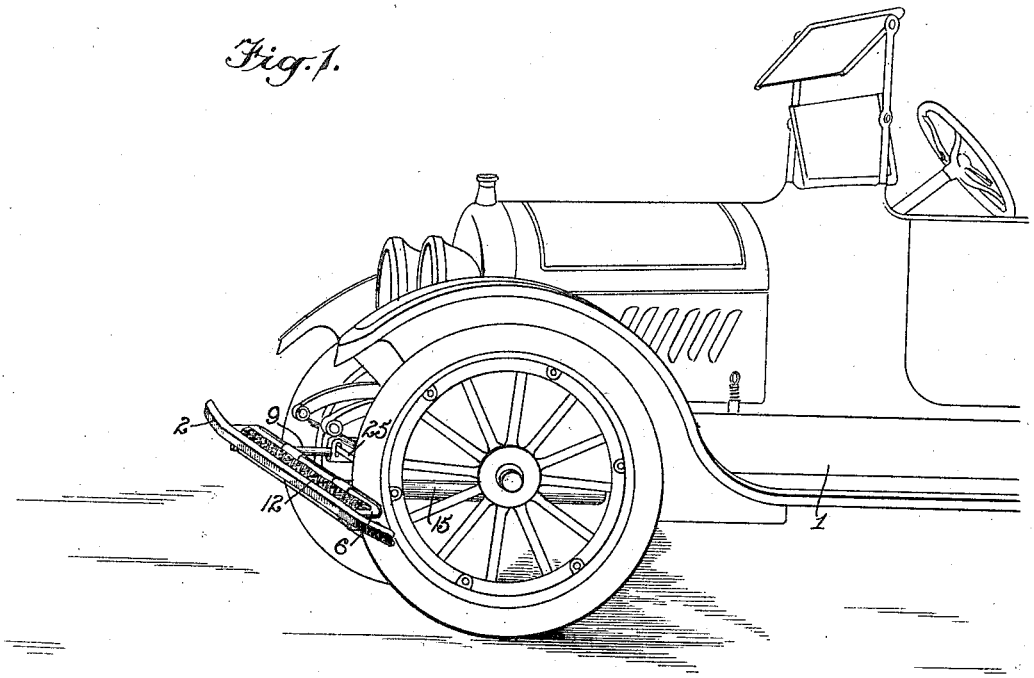
Figure 1 is a perspective view of the front part of an automobile showing an embodiment of the invention applied thereto.

Referring to the accompanying drawings by numerals, 1 indicates an automobile of any desired kind to which the fender is secured, the fender when folded appearing as shown in Fig. 1. In this figure it will be observed that the bar 2 acts as an ordinary buffer and is shaped as such while acting as a brace for holding and stiffening the upper part of the frame 3. The frame 3 acts as an upper buffer while frame 4 acts as a lower buffer, these frames being pivotally connected by suitable pivot pins 5, there being a pivot pin for each of the bars of the respective frames. Frame 4 is formed with a substantially U-shaped cross bar 6 at the front end and with two rearwardly extending bars 7 and 8 connected by the pivotal pins 5 to the bars 9 and 10. A flexible bar or cable, as for instance, the wire cable 11, connects the arms of the U-shaped bar 6, and to the cable 11 the sheet or net 12 is secured whereby when an article strikes the net and also the cable 11 a slight give or resiliency will be produced so as to cushion the shock.

The bars 9 and 10 of frame 3 are provided with a substantially U-shaped cross bar 13 at the upper end, to the arms of which the buffer 2 is secured and also a suitable roller 14 which has a spring therein for winding the net 12 when the parts are folded preparatory to being forced into the tubular casings 15 and 16. The net 12 is secured at one end to the roller 14 and at the other to the cable 11 so that when the parts are forced from the position shown in Fig. 3 to the position shown in Fig. 4 the net 12 will unwind and the spring in the roller 14 will become wound. When the frames 3 and 4 are brought together manually preparatory to assembling the parts as shown in Fig. 1, the spring in the roller 14 will cause the rotation of the roller and, consequently, the winding of the net on said roller. The bars 8 and 9 are designed to be telescoped into the casing 16 while the bars 7 and 10 are designed to be telescoped into the casing 15, as shown in Fig. 5, when the parts are in their assembled or folded position.

When the parts are in the open position as shown in Fig. 4 and a body strikes the net 12, frame 4 is held in its lowered position by means of a hook 17 interlocking with part of the respective casings 15 and 16, there being one hook for each of the bars 7 and 8. As the frame 3 is pivotally connected with frame 4 the frame 3 cannot move downwardly as long as the hooks 17 are engaged as shown in Fig. 4. If the parts are in the position shown in Fig. 4 and it is desired to fold the same, frame 4 is pulled slightly toward the front until hook 17 has been disengaged, whereupon the same is moved upwardly until in alinement with the casings and then frame 3 is pulled downwardly, after which the parts are forced directly into the casings, bars 7 and 10 entering casing 15 while bars 8 and 9 enter casing 16. From Fig. 3 it will be observed that the roller 14, when the parts are folded, is positioned near the front of the casings but does not enter therein, as the casings are merely tubular members, as shown in Fig. 5, for receiving the bars forming special parts of the frames 3 and 4.

Arranged in each casing is a spring 18 acting against the end of the casing and against the piston member 19 which is connected with a rod 20, and rod 20 in turn is pivotally connected by means of the pin 5 to the bars 7 and 10 as shown in Figs. 4 and 5. A spring 21 is connected to the piston 19 and also to the bar 10 so as to cause the frames 3 and 4 to quickly assume the position shown in Fig. 4 when forced outwardly by spring 18. When the frames are folded and forced inwardly to the position shown in Fig. 3, spring 21 will be brought under tension and spring 18 will also be compressed. These springs are held under tension and compression respectively by means of the hook or loop member 22 mounted on the cross bar 23 of frame 4, said hook or loop member fitting over the hook or projection 24 on the bar 25. Bar 25 extends through both of the casings so as to limit the outward movement of the respective bars 7, 8, 9 and 10 and to be in proper position for holding the loop 22 against movement when the parts are folded. A crank or arm 26 is connected to bar 25 and a link 27 is connected to said crank, as shown in Fig. 4. Link 27 is provided with a stop 28 designed to engage the fixed or stationary stop 29 so as to prevent the movement of link 27 in one direction. A spring 30 is connected with the stationary stop 29 and with link 27 for urging the link to the position shown in Fig. 4. Link 27 at the rear end is provided with a slot 31 for receiving the pin 32 carried by the rod 33, said rod having an enlarged end 34 designed to be engaged by the foot of the operator, and also by a spring 35 which normally holds the rod 33 in an elevated position and, consequently, stop 28 in engagement with the fixed stop 29.

Figure 2:
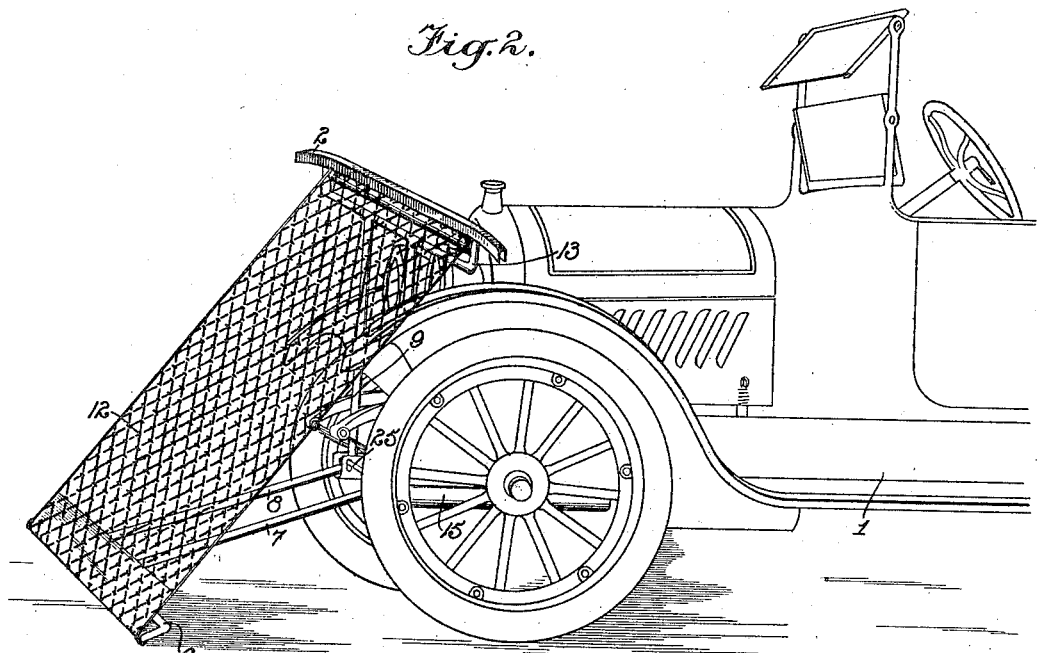
Fig. 2 is a view similar to Fig. 1 but showing the fender in an unfolded or operative position.

When the parts are in the position shown in Fig. 3 the loop member 22 is engaging the projection 24. If it should be desired to operate the device the operator presses the enlargement or knob 34 and thereby swings the link 27 downwardly until stop 28 is disengaged from the stationary stop 29. This will allow the spring 18 to force the piston 19 and parts carried thereby, including the frames 3 and 4, outwardly as member 24 has been moved away from or out of engagement with the loop member 22. As spring 28 acts quickly it will be evident that it will require only a very short time to unfold the device as shown in Fig. 2 when the parts are released. When it is desired to again fold the parts to the position shown in Fig. 2 it is necessary for the operator, or some one, to manually move the parts to a folded position and then force the proper parts into the casings 15 and 16.

What I claim is:

1. A fender comprising a pair of casings, a pair of frames pivotally connected together, each of said frames having a pair of rods, one rod of each frame telescopically fitting into one of said casings, a catch for normally holding said rods in said casings, a spring for forcing said rods out of the casings, means for releasing said catch, and a net or sheet spread by said frames when said rods are forced out of said casings.

2. A fender comprising a pair of frames hinged together, a hook on one of said frames, each of said frames being provided with a pair of bars, a pair of casings for receiving said bars, said hook being adapted to engage said casings when the parts are in an unfolded condition for preventing accidental folding, and a sheet or net held in position by the frames when in an unfolded position.

3. A fender of the character described, comprising a pair of foldable frames, a buffing member connected with one of the frames, means for holding said frames in a folded position so that the buffing member will be held at the usual position on an automobile, a spring for moving said frames to an open position, and means for releasing said spring.

4. In a fender of the character described, a pair of casings, a spring arranged in each casing, a pair of foldable members having rods adapted to slidingly fit into said casings and compress said springs, means for locking said rods against outward movement when arranged in the casing while allowing a further inward movement, means for releasing the member holding the foldable members in the casing, and a buffer bar connected to one of the movable members for acting as a buffer when the movable members are folded, said buffer bar being yieldable in one direction against the action of said spring and immovable in the opposite direction.

5. A fender comprising a pair of tubular members, a pair of foldable frames, a net connected with said frames and adapted to be spread thereby when the frames are opened, each of said frames having a pair of spaced rearwardly extending bars, one bar of each pair being fitted into one of said tubular members, a spring in each of said tubular members, a piston in each of said tubular members connected with said bars whereby when the bars are forced into the tubular members the springs will be compressed, a transversely extending bar connecting said tubular members, said last mentioned bar having a projection acting as a catch, a loop member connected with one of said frames and adapted to fit over said catch, means for normally holding said catch against movement thereby locking said foldable members in said tubular members, and a normally operated releasing member for turning said catch to a released or disengaged position whereby said springs will project said movable members to an outer position, and a spring member for spreading the movable members.

6. In a device of the character described, a pair of tubular casings, a spring arranged in each casing, a piston arranged in each casing for compressing said springs, a piston rod extending forwardly through each of said pistons, a pair of frames having members pivotally connected with said pistons and telescopically fitting in said casings when the pistons press said springs, a catch for normally holding said telescoping members in the casings, manually operated means for releasing said catch, a spring for each piston connected with the respective pistons and one of said frames for causing a spreading action of the frames when forced from the casings by said first mentioned springs, and a net connected to the outer end of said frames, said net being unfolded or spread when the frames are separated.

ALBERT LEIBNER.

Copies of this patent may be obtained for five cents each, by addressing the "Commissioner of Patents, Washington, D. C."